United States Patent [19]

Kakumoto

[11] 4,426,876
[45] Jan. 24, 1984

[54] METHOD AND APPARATUS FOR CHECKING SEALED CONTAINERS FOR PINHOLES

[75] Inventor: Michio Kakumoto, Naruto, Japan

[73] Assignee: Otsuka Pharmaceutical Factory, Inc., Japan

[21] Appl. No.: 261,188

[22] PCT Filed: Aug. 22, 1980

[86] PCT No.: PCT/JP80/00193

§ 371 Date: May 3, 1981

§ 102(e) Date: May 1, 1981

[87] PCT Pub. No.: WO81/00765

PCT Pub. Date: Mar. 19, 1981

[30] Foreign Application Priority Data

Sep. 3, 1979 [JP] Japan ................................. 54-113295
Sep. 3, 1979 [JP] Japan ................................. 54-113296

[51] Int. Cl.³ ............................................ G01M 03/32
[52] U.S. Cl. ................................... 73/49.3; 73/52; 209/526; 209/591
[58] Field of Search ............... 73/52, 49.3, 45, 45.1, 73/45.2, 45.4; 209/526, 591

[56] References Cited

U.S. PATENT DOCUMENTS

| | | | |
|---|---|---|---|
| 2,863,316 | 12/1958 | Abplanalp | 73/45 |
| 3,390,569 | 7/1968 | McMeekin | 209/591 X |
| 3,847,013 | 11/1974 | Luy | 73/45.4 |
| 3,956,923 | 5/1976 | Young et al. | 73/49.3 |
| 3,973,249 | 8/1976 | Yokota et al. | 73/49.2 |
| 4,331,722 | 5/1982 | Packo et al. | 73/49.3 |

FOREIGN PATENT DOCUMENTS

| | | | |
|---|---|---|---|
| 49-31915 | 8/1974 | Japan | 73/49.3 |
| 50-142280 | 11/1975 | Japan | 73/49.3 |
| 998908 | 7/1965 | United Kingdom | 73/52 |
| 1083475 | 9/1967 | United Kingdom | 73/49.3 |

*Primary Examiner*—Daniel M. Yasich
*Attorney, Agent, or Firm*—Larson and Taylor

[57] ABSTRACT

This invention relates to a method of and an apparatus for checking sealed containers for pinholes in a vacuum which containers have enclosed therein a vaporizable material, such as a glucose injection solution, distilled water for injection, milk or oil, or a sublimable substance, such as naphthalene (hereinafter referred to collectively as a "vaporizable substance"). With this invention, the vaporizable substance adhering to the sealed container and remaining in a checking chamber is vaporized first by a vaporizing suction means communicating with the checking chamber, and the vaporized substance is cooled and collected by a cooling heat exchanger to eliminate before checking the disturbances due to the vaporizable substance and to thereby assure accurate detection of pinholes.

9 Claims, 8 Drawing Figures

METHOD AND APPARATUS FOR CHECKING SEALED CONTAINERS FOR PINHOLES

This invention relates to a method of and an apparatus for checking sealed containers of synthetic resin, paper, metal, etc. for pinholes (pinholes, cracks, etc.) which containers have enclosed therein a vaporizable material, such as a glucose injection solution, distilled water for injection, milk or oil, or a sublimable substance, such as naphthalene. (Such a material or substance will be referred to as a "vaporizable substance" in this specification and the appended claims.)

As a method of checking this type of containers for pinholes, containers have heretofore been checked for pinholes in a vacuum. The checking method has been used chiefly for detecting pinholes in sealed containers which contain a non-electroconductive liquid and which are not amenable to electrical checking.

This vacuum checking method is practiced by placing a sealed container in an airtight checking chamber, evacuating the chamber to a predetermined vacuum, thereafter stopping or interrupting the evacuation of the chamber and subsequently measuring the rise of the internal pressure of the chamber. The increased pressure value, when not lower than a predetermined standard value, indicates that the container has a pinhole since the increase of the pressure is attributable to the presence of a pinhole through which the enclosed substance vaporizes. (The term "vaporize" as used in the specification and the appended claims refers to the change of the above-mentioned vaporizable substance from the liquid state to the vapor or gaseous state, or from the solid state to the sublimation. The increased pressure value, if lower than the standard value, indicates that the container has no pinhole.

However, whereas the enclosed substance flows out from the pinhole of a defective container into the checking chamber during checking and remains therein, the method involves no expedient for effectively removing the remaining substance. The remaining substance vaporizes again in a vacuum during the next checking cycle, consequently increasing the internal pressure of the checking chamber to the standard value or higher to erroneously indicate that the sealed container subsequently checked has a pinhole even when free from any pinhole. If the standard value is set at a higher level to avoid such erroneous detection, there is the likelihood that a container with a pinhole will be accepted as a faultless one.

Futher aside from the substance flowing out through a pinhole and remaining in the checking chamber, a vaporizable substance will adhere to the surface of a sealed container before checking for one reason or another. The adhering vaporizable substance also vaporizes during checking to act as a disturbance (noise). The checking result is then likely to indicate that the container has a pinhole even if having no pinhole. Additionally another trouble arises in that the substance will flow off the surface of the container and similarly remains in the checking chamber to act as a disturbance during the subsequent checking cycle.

If it is attempted to completely remove the remaining vaporizable substance from the checking chamber after checking in preparation for the following checking cycle, the checking chamber must be evacuated for a prolonged period of time. This leads to an inefficient checking operation and is objectionable especially to a continuous operation for checking large quantities of sealed containers.

An object of the present invention is to provide a method of and an apparatus for checking sealed containers for pinholes accurately and efficiently in a state substantially free from disturbances.

According to the invention, this problem is solved by "a method of checking sealed containers for pinholes with a vaporizable substance enclosed therein characterized by placing the sealed container into a first chamber, hermetically closing the first chamber, evacuating the first chamber to a vacuum by vaporizing vacuum suction means connected to the first chamber to vaporize a vaporizable substance off the surface of the sealed container, substantially removing the vaporizable substance from the surface of the sealed container by cooling and collecting the vaporized substance with a cooling heat exchanger so disposed as to act on the interior of the first chamber, thereafter placing the sealed container into a second chamber connected to the first chamber, hermetically closing the second chamber, evacuating the second chamber to a predetermined vacuum by measuring vacuum suction means connected to the second chamber, thereafter interrupting the evacuation of the second chamber, measuring increase of the pressure within the second chamber, and judging that the container has a pinhole when the increased pressure value is not lower than a predetermined standard pressure value or that the container has no pinhole when the increased pressure value is lower than the standard pressure value," and also by "an apparatus for checking sealed containers for pinholes with a vaporizable substance enclosed therein characterized in that the apparatus comprises a first chamber having an inlet and an outlet for the sealed containers, a second chamber having an inlet and an outlet for the sealed containers and connected to the first chamber with the inlet of the second chamber in communication with the outlet of the first chamber, first closure means for hermetically closing the inlet of the first chamber, second closure means for hermetically closing the outlet of the first chamber and the inlet of the second chamber, third closure means for hermetically closing the outlet of the second chamber, vaporizing vacuum suction means connected to the first chamber, a cooling heat exchanger disposed to act on the interior of the first chamber, and measuring vacuum suction means and pressure measuring means connected to the second chamber."

The term "cooling and collecting" as used in the specification and the appended claims refers to freezing or liquefying a vaporized substance and maintaining the substance in a frozen or liquid state.

To reduce disturbances in the second chamber more effectively and rapidly, the above method and apparatus are so adapted that the substance, when flowing our or vaporizing from the sealed container into the second chamber during the judgment of the pinhole in the second chamber, is cooled and collected by a cooling heat exchanger so disposed as to act on the interior of the second chamber in preparation for subsequent checking while evacuating the second chamber to a vacuum again after the judgment.

Another object of the invention is to provide a method of and an apparatus for checking sealed containers for pinholes by which the sealed containers having a large pinhole are rejected first, and the other containers are further checked for smaller pinholes accurately and efficiently in a state substantially free from disturbances.

According to the invention, this problem is solved by "a method of checking sealed containers for pinholes as described above and further characterized by substantially removing a vaporizable substance from the interior of the first chamber and from the surface of the sealed container within the first chamber, thereafter evacuating the first chamber to a predetermined vacuum by measuring vacuum suction means connected to the first chamber, interrupting the evacuation of the first chamber, thereafter measuring increase of the pressure within the first chamber, and discharging the sealed container from the first chamber when the increased pressure value is not lower than a predetermined auxiliary standard pressure value or placing the sealed container into the second chamber connected to the first chamber when the increased pressure value is lower than the auxilliary standard pressure value", and also by "an apparatus for checking sealed containers for pinholes as described above and further characterized in that the apparatus has measuring vacuum suciton means and pressure measuring means which are connected to the first chamber."

To reduce distrubances in the second chamber more effectively and rapidly, the above method and apparatus are so adapted that the substance, when flowing out or vaporizing from the sealed container into the second chamber during the judgment of the pinhole in the second chamber, is cooled and collected by a cooling heat exchanger so disposed as to act on the interior of the second chamber in preparation for subsequent checking while evacuating the second chamber to a vacuum again after the judgment.

Another object of the invention is to privide an apparatus for practicing the above method more efficiently.

According to the invention, this problem is solved by "an apparatus for checking sealed containers for pinholes with a vaporizable substance enclosed therein characterized in that the apparatus comprises a plurality of units arranged on a rotatable support base and spaced apart along the periphery of the base, each of the units including a first chamber having an inlet and an outlet for the sealed containers, a second chamber having an inlet and an outlet for the sealed containers and connected to the first chamber with the inlet of the second chamber in communication with the outlet of the first chamber, first closure means for hermetically closing the inlet of the first chamber, second closure means for hermetically closing the outlet of the first chamber and the inlet of the second chamber and third closure means for hermetically closing the outlet of the second chamber, the units being movable along a path having a station for feeding the sealed container to be checked, a station for discharging unacceptable sealed containers and a station for delivering acceptable sealed containers, the first chamber of each of the units being connected to vaporizing vaccum suction means and a cooling heat exchanger being so disposed as to act on the interior of the first chamber, the second chamber of each of the units being connected to measuring vacuum suction means and pressure measuring means".

To eliminate disturbances from the second chamber of the apparatus more effectively and rapidly, the second chamber can be connected to vaporizing vacuum suction means and a cooling heat exchanger can be so disposed as to act on the interior of the second chamber.

The first chamber of the apparatus can be connected with measuring vacuum suction means and pressure measuring means by which the sealed containers with a large pinhole are rejected first.

Another object of the invention is to provide a method of and an apparatus for accurately checking sealed containers for pinholes in a state substantially free from disturbances by wholly collecting a vaporizable substance from a checking chamber and the surface of the container, in the checking chamber before the container is checked for pinholes.

According to the invention, this problem is solved by "a method of checking sealed containers for pinholes with a vaporizable substance enclosed therein characterized by placing the sealed container into a checking chamber, hermetically closing the checking chamber, evacuating the checking chamber to a vacuum by vaporizing vacuum suction means connected to the checking chamber to vaporize a vaporizable substance from the interior of the checking chamber and the surface of the sealed container, substantially removing the vaporizable substance from the interior of the checking chamber and the surface of the sealed container by cooling and collecting the vaporized substance with a cooling heat exchanger so disposed as to act on the interior of the checking chamber, thereafter evacuating the checking chamber to a predetermined vacuum by measuring vacuum suction means connected to the checking chamber, subsequently interrupting the evacuation of the checking chamber, measuring increase of the pressure within the checking chamber, and judging that the container has a pinhole when the increased pressure value is not lower than a predetermined standard pressure value or that the container has no pinhole when the increased pressure value is lower than the standard pressure value", and also by "an apparatus for checking sealed containers for pinholes with a vaporizable substance enclosed therein characterized in that the apparatus comprises a checking chamber having an inlet and an outlet for the sealed containers, first closure means for hermetically closing the inlet, second closure means for hermetically closing the outlet, vaporizing vacuum suction means for vaporizing a vaporizable substance in the checking chamber, a cooling heat exchanger so disposed as to act on the interior of the checking chamber for cooling and collecting the vaporized substance in the checking chamber, measuring vacuum suction means for evacuating the checking chamber to a predetermined vacuum and thereafter interrupting the evacuation of the checking chamber, and pressure measuring means for measuring increase of the pressure within the checking chamber after the interruption of the evacuation."

Another object of the invention is to provide an apparatus for accurately checking with an improved efficiency sealed containers for pinholes in a state substantially free from disturbances by wholly collecting a vaporizable substance from a checking chamber and the surface of the container, in the checking chamber before the container is checked for pinholes.

According to the invention, this problem is solved by "an apparatus for checking sealed containers for pinholes characterized in that the apparatus comprises a plurality of units arranged on a rotatable support base and spaced apart along the periphery of the base, each of the units including a checking chamber having an inlet and an outlet for the sealed containers, first closure means for hermetically closing the inlet and second closure means for hermetically closing the outlet, the units being movable along a path having a station for feeding the sealed container to be checked, a station for discharging unacceptable sealed containers and a station for delivering acceptable sealed containers, the checking chamber of each of the units being connected to vaporizing vacuum suction means for vaporizing a vaporizable substance in the checking chamber, measuring vacuum suction means for evacuating the checking chamber to a predetermined vacuum and thereafter interrupting the evacuation of the checking chamber and pressure measuring means for measuring increase of the pressure within the checking chamber after the interruption of the evacuation, a cooling heat exchanger being so disposed as to act on the interior of the checking chamber for cooling and collecting the vaporized substance in the checking chamber of each of the units."

The above and other objects, features and benefits of the present invention will become apparent from the following description of the invention with reference to the accompanying drawings, in which.

Figure 1:
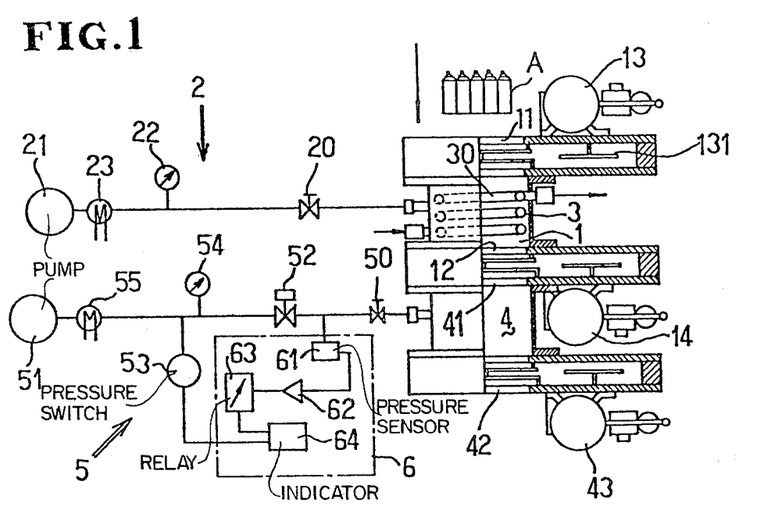
FIG. 1 is a schematic side elevation partly broken away and showing an embodiment of the apparatus of the invention.

For example, a sealed container A having a plurality of synthetic resin vessels joined together side by side and enclosing distilled water for injection is checked for pinholes by an apparatus shown in FIG. 1. First, the container A is placed into a first chamber 1, which is then hermetically closed and evacuated by a vaporizing vacuum suction means 2 in communication with the first chamber 1 to produce a vacuum and vaporize vaporizable substances, such as water, oil and volatiles, off the surface of the container A. The vaporized substances are frozen to and collected on a cold trap 3 disposed within the first chamber 1 to substantially remove the vaporizable substances from the surface of the sealed container A.

The first chamber 1 has a top wall and a bottom wall formed with an inlet 11 and an outlet 12 for the sealed container A. The inlet 11 and outlet 12 are provided with first closure means 13 and second closure means 14. The means 13 is of the type comprising a closure 131 slidably provided for the inlet 11 to open or hermetically close the inlet 11 and an air cylinder or like pneumatic means which is operable by an electromagnetic valve for opening or closing the closure 131. (An example of such means is a gate-type pneumatic valve Model VAP, product of Nippon Shinku Gijutsu Kabushiki Kaisha.) Various other automatic or manual known devices are of course usable as the closure means. The closure means 14 has the same construction as the means 13. With the inlet 11 of the chamber 1 opened and the outlet 12 closed by the means 13 and 14, the sealed container A is placed into the chamber 1 through the inlet 11 under gravity, and the inlet 11 is thereafter closed by the means 13 to render the chamber 1 hermetic.

The vaporizing vacuum suction means 2 comprises a vacuum pump 21 connected to the first chamber 1 by pipe.

When desired, a valve (such as a manual valve 20) for maintenance, inspection, etc. and a vacuum gauge 22 for checking the operation of the vacuum suctions means 2 can be suitably connected to the pipe between the first chamber 1 and the pump 21. A cold trap or other cooling heat exchanger 23 for protecting the pump 21 can also be connected thereto in the vicinity of the pump.

The cold trap 3 disposed within the first chamber 1 is of the known type having a pipe 30 extending along the inner wall of the first chamber 1 so as not to interfere with the container A for passing liquid nitrogen or like refrigerant therethrough. The cold trap 3 is removably disposed in the first chamber so as to be optionally withdrawable therefrom for replacement when becoming not fully usable due to freezing of an excess of vaporized substances to the trap, although the trap can be fixedly provided in the chamber 1. In the latter case, an unillustrated liquid receptacle adapted for communication with the outside of the chamber is disposed under the trap 3 to withdraw the frozen subtances as liquefied in the event of excessive freezing. The trap can be provided with a suitable heater to rapidly liquefy the substances.

Figure 2:
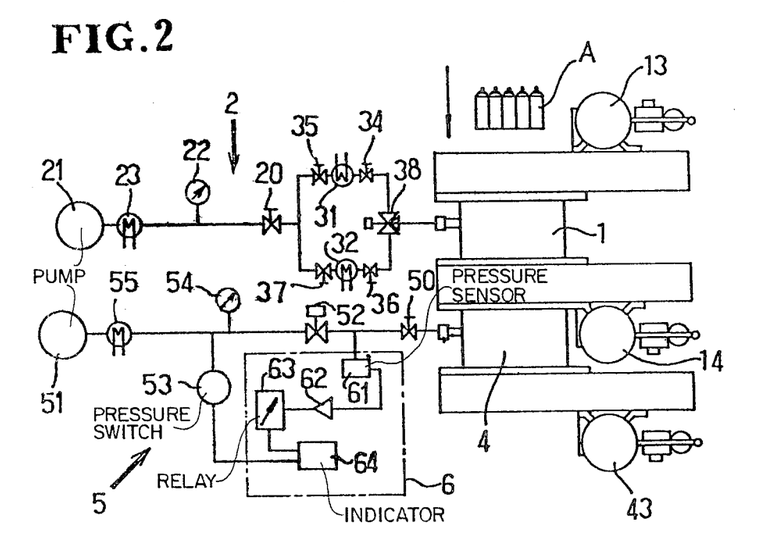
FIG. 2 is a schematic side elevation showing another embodiment of the apparatus of the invention.

The cold trap for freezing and collecting vaporized substances may be arranged within the vacuum suction means 2 as seen in FIG. 2. In this case, it is of course desirable to position the cold trap close to the first chamber to the greatest possible extent. Further as seen in FIG. 2, a plurality of cold traps 31 and 32 may be provided side by side so that one or two or all of the traps can be used selectively or simultaneously as desired by operating a valve (three-way electromagnetic valve in the illustrated case) 38 located at a junction in accordance with the capacity of the trap, the interior humidity of the first chamber, etc. In such a case also, the traps may be made replaceable or can be provided with means for removing excessively frozen substances. FIG. 2 further shows manual valves 34, 35, 36 and 37 which are closable when, for example, the traps are to be replaced.

The cold traps 3, 31, 32 and other cold traps useful for this invention are adapted to freeze vaporized substances but may be those of the type for liquefying such substances and maintaining them in a cold liquid state. However those of the freezing type are especially preferable.

In place of the cold traps, other cooling heat exchangers are of course usable which have the same function (i.e. the function of freezing or liquefying vaporizable substances). For example, the first chamber 1 can be provided with a double wall construction serviceable as a heat exchanger of the jacket type.

After the vaporizable substances have been substantially removed from the surface of the sealed container A, the container A is led into a second chamber 4 positioned under and connected to the first chamber 1. The second chamber 4 is then hermetically closed and evacuated to a predetermined vacuum by a measuring vacuum suction means 5 communicating with the second chamber 4. With the application of the suction on the second chamber thereafter stopped or interrupted, the rise of the internal pressure of the second chamber is measured by a pressure measuring means 6. The increased pressure value indicates that the container has a pinhole when it is not lower than a predetermined standard pressure value or that the container has no pinhole when it is lower than the standard value.

The second chamber 4 has a top wall and a bottom wall formed with an inlet 41 and an outlet 42 for the sealed container A. The outlet 42 is provided with third closure means 43 of the same construction as the first and second closure means 13 and 14. The inlet 41 is in communication with the outlet 12 of the first chamber 1 without being exposed to the atmosphere. The inlet 41 is located substantially at the same position as the outlet 12 of the first chamber 1, so that the second closure means 14 also opens or closes the inlet 41 of the chamber 4 at the same time. When the sealed container A is to be placed from the first chamber 1 into the second chamber 4, the outlet 11 of the chamber 1 and inlet 41 of the chamber 4 are opened with the outlet 42 of the chamber 4 closed by the means 43, and the container A is then allowed to fall into the chamber 4, whereupon the inlet 41 of the chamber 4 is closed by the means 14 to render the chamber 4 hermetic.

The measuring vaccum suction means 5 comprises a vacuum pump 51 connected to the second chamber 4 by a pipe, an electromagnetic valve 52 connected between the second chamber 4 and the pump 51 and a pressure switch 53 for operating the valve 52. When the second chamber 4 is evacuated by the pump 51 to a predetermined vacuum, the pressure switch 53 functions to close the valve 52 to stop or interrupt the application of suction to the second chamber 4. As the means for stopping or interrupting the application of suction to the second chamber 4 when the second chamber 4 is evacuated to the predetermined vacuum, it is possible to use other suitable means, such as a suitable pressure gauge, in place of the pressure switch 53 and a manual valve, in place of the electromagnetic valve 52, which is closed while the operator is watching the pressure gauge.

When desired, a valve 50 for maintenance, inspection, etc. and a vacuum gauge 54 for checking the operation of the vacuum suction means 5 can be suitably connected to the pipe between the second chamber 4 and the pump 51. A cold trap or other cooling heat exchanger 55 for protecting the pump 51 can also be connected to the pipe in the vicinity of the pump 51.

The pressure measuring means 6 comprises a pressure sensor 61 positioned between the second chamber 4 and the vacuum suction stop valve 52 and connected to the pipe from the second chamber for detecting the rise of pressure within the second chamber 4 and converting the pressure value to a current, an amplifier 62 for amplifying the input from the pressure sensor, a meter relay 63 for indicating the input from the amplifier 62 and also for emitting a signal indicating whether or not the input from the amplifier 62 is lower than the predetermined standard value stored therein for detecting pinholes, and an indicator 64 for indicating the presence or absence of a pinhole in accordance with the input from the meter relay 63.

Accordingly pinholes can be detected by the operator memorizing the standard value and monitoring the meter relay 63, or merely by watching the indicator 64.

The indicator 64 may be provided with means for receiving a signal from the pressure switch 53 to indicate whether or not the measuring means is in checking operation (in other words, whether the electromagnetic valve 52 is open or closed). Furthermore for an automatic checking operation, the indicator 64 can be provided therein with a controller for automatically controlling, for example, electromagnetic valves suitably provided for the vacuum suction means and electromagnetic valves for the closure means 13, 14 and 43 in accordance with a signal from the meter relay 63 or the amplifier 62 and/or a signal from the pressure switch 53.

A simple pressure gauge or other suitable means is usable in place of the foregoing arrangement to serve as the above pressure measuring means.

After the completion of the checking operation, the outlet 42 of the second chamber 4 is opened by the closure means 43, and the sealed container A is delivered therefrom by being allowed to fall under gravity.

When the article A checked in the second chamber 4 has a pinhole, the substance enclosed in the container and flowing out or vaporized through the pinhole naturally remains in the second chamber 4 after the checking operation. Although the remaining substance is removable by thereafter hermetically closing the second chamber and evacuating the chamber by the means 5, it is desired to remove the remaining substance more reliably and quickly to subsequently assure an accurate pinhole detecting operation. For illustrative purposes, this method will be described with reference to an apparatus shown in FIG. 3 which is an improvement over the apparatus shown in FIG. 2. After the container A is delivered from the second chamber 4 upon completion of checking, the outlet 42 of the second chamber 4 is closed and rendered hermetic and is thereafter evacuated again to a vacuum by operating vaporizing vacuum suction means 7 (more particularly, a pump 74) in communication with the second chamber to vaporize the remaining substance. The vaporized substance is frozen to and collected on cold traps 71 and 72 included in the suction means 7 and located close to the second chamber.

Figure 3:
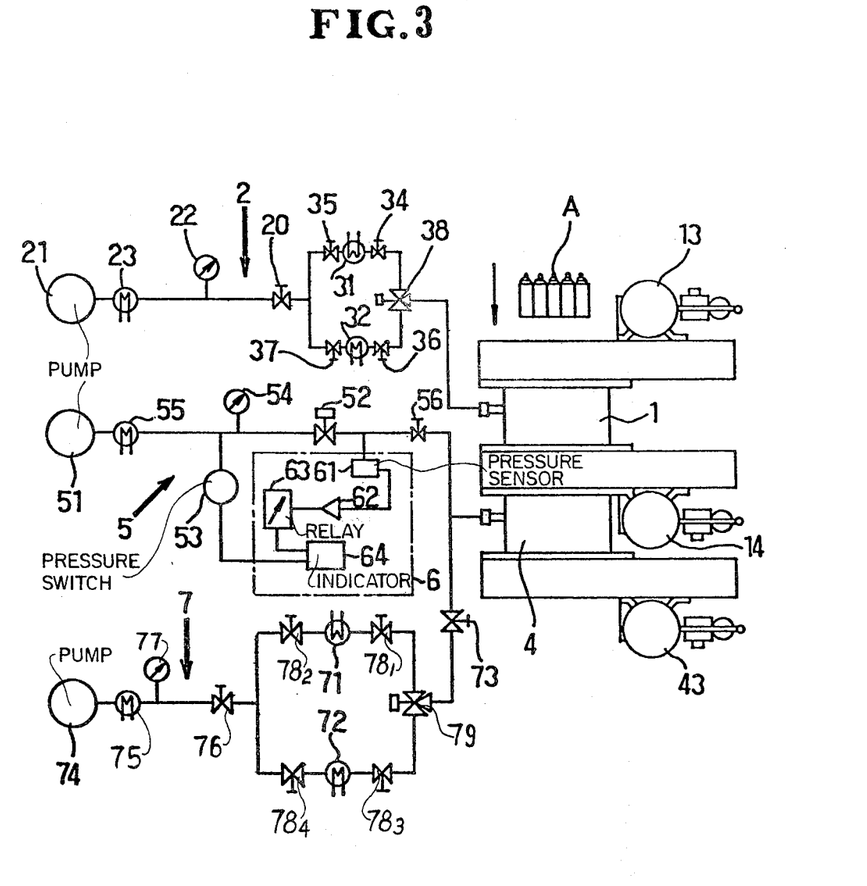
FIG. 3 is a schematic side elevation showing still another embodiment of the apparatus of the invention.

The vaporizing vacuum suction means 7 and the cold traps 71 and 72 are similar in construction to the vaporizing vacuum suction means 2 and the cold traps 31 and 32 shown in FIG. 2 for the first chamber and are similarly connected to the second chamber 4. However, valves 56 and 73 are provided for closing the means 5 while the means 7 is in operation and for closing the means 7 while the means 5 is in operation. Electromagnetic valves are usable for the valves 56 and 73 for an automatic operation. In FIG. 3, reference numeral 75 designates a cooling heat exchanger for protecting the pump 74; 76,a manual valve; 77,a vacuum gauge; 781, 782, 783 and 784, manual valves; and 79, a three way electromagnetic valve.

Figure 4:
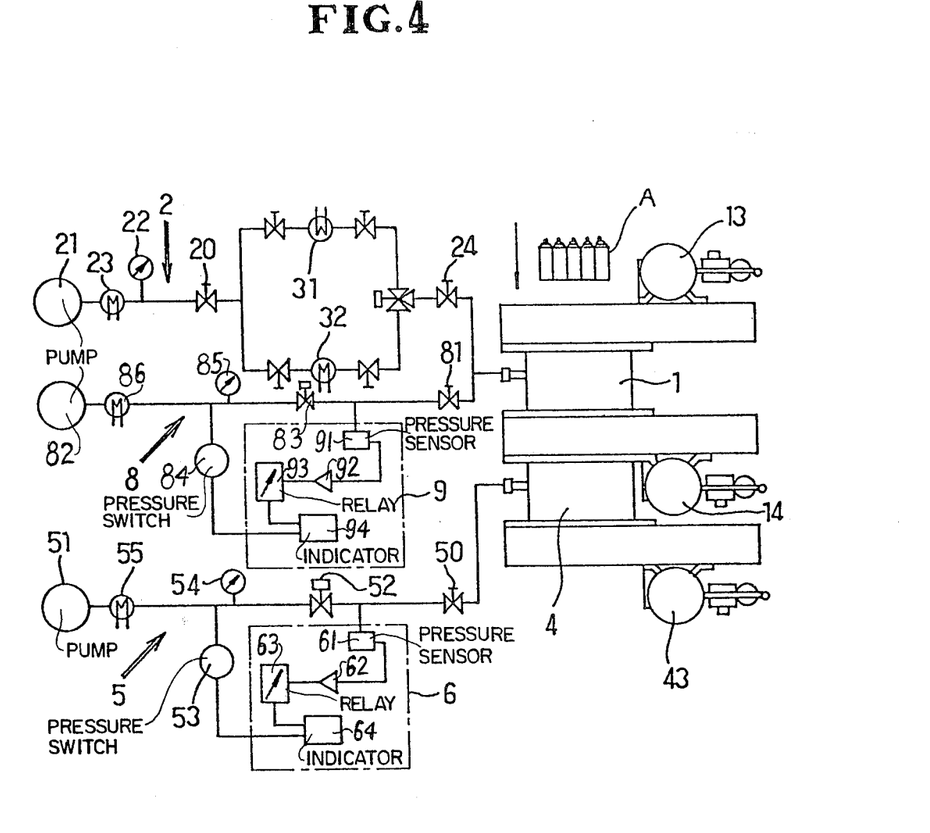
FIG. 4 is a schematic side elevation showing still another embodiment of the apparatus of the invention.
Figure 5:
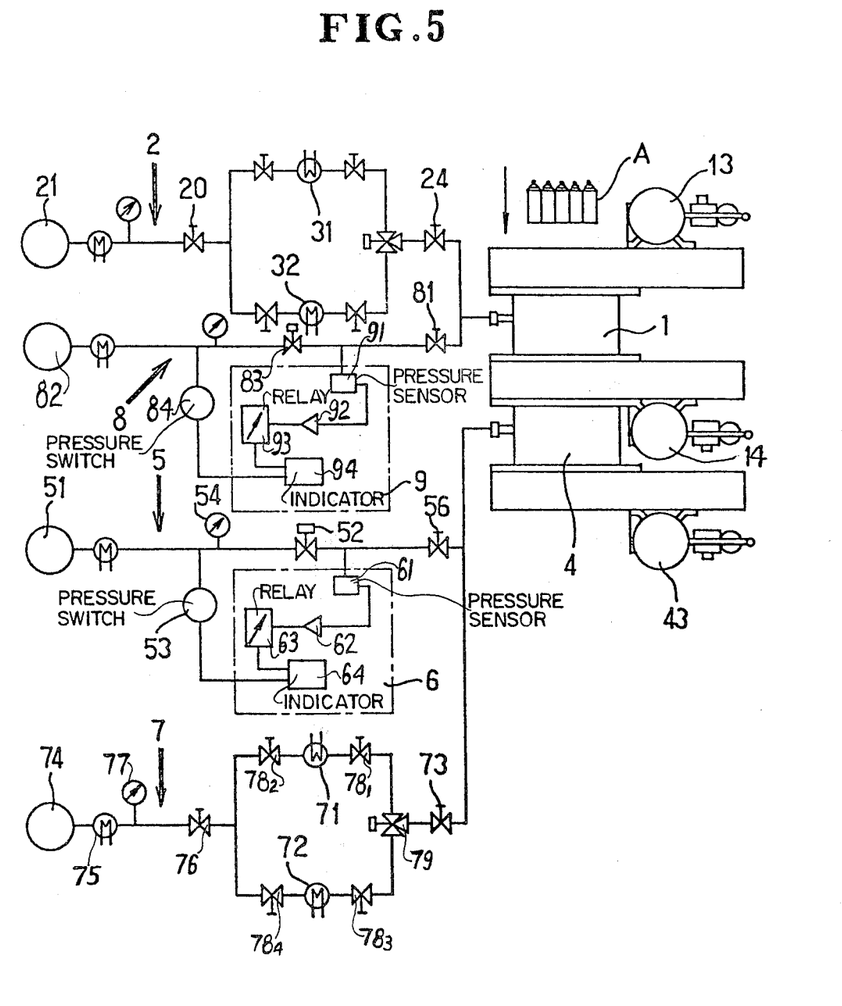
FIG. 5 is a schematic side elevation showing still another embodiment of the apparatus of the invention.

It is desirable that containers A having a large pinhole and permitting the enclosed substance to vaporize markedly through the pinhole in a vacuum be prechecked in the first chamber 1 for rejection, in ensuring efficiency, rendering the second chamber 4 free from extraneous disturbances and accurately and rapidly detecting smaller pinholes in the second chamber 4. For illustrative purposes, this method will be described with reference to an apparatus shown in FIG. 4 which is an improvement over the apparatus shown in FIG. 2 and also to an apparatus shown in FIG. 5 which is an improvement over the one shown in FIG. 3. First, a sealed container A is placed into the first chamber 1, which is then hermetically closed and evacuated to a vacuum by the vaporizing vacuum suction means 2 to vaporize vaporizable substances off the surface of the container A and also off the interior side of the first chamber, if any. The vaporized substances are cooled and collected by the cold traps 31 and 32 disposed in the means 2 to substantially remove the vaporizable deposits from the first chamber and the container A. Measuring vacuum suction means 8 connected to the first chamber 1 is then operated to evacuate the first chamber 1 to a predetermined vacuum and thereafter stopped. Subsequently the rise of the pressure within the first chamber 1 is measured by pressure measuring means 9. If the increased pressure value is not lower than an auxiliary standard value for detecting large pinholes, the outlet 12 of the first chamber 1 and the inlet 41 and outlet 42 of the second chamber 4 are opened by the closure means 14 and 43 to discharge the container from the first chamber 1 through the second chamber 4 by falling. When the increased pressure value is lower than the auxiliary standard value, the outlet 12 of the first chamber and the second chamber inlet 41 are opened without opening the second chamber outlet 42 to place the container A into the second chamber 4. Subsequently the same treatment as in the apparatus of FIG. 1 or 2 is conducted for the apparatus shown in FIG. 4, or the same treatment as in the apparatus of FIG. 3 is carried out for the apparatus of FIG. 5. However, the standard value used for the checking in the second chamber is preferably lower than the auxiliary standard value. The measuring vacuum suction means 8 and the pressure measuring means 9 of the apparatus shown in FIGS. 4 and 5 are similar in construction to the suction means 5 and the the pressure measuring means 6 for the second chambers 4 shown in FIGS. 2 and 3 and are similarly connected to the first chamber 1. In FIGS. 4 and 5, a vacuum pump is indicated at 82; an electromagnetic valve at 83; a pressure switch for operating the valve 83 is indicated at 84; a vacuum gauge at 85; and a cooling heat exchanger for protecting the pump 82 is indicated at 86. The pressure measuring means 9 includes a pressure sensor 91, an amplifier 92, a meter relay 93 and an indicator 94. Valves 24 and 81 are provided for closing the means 2 while the means 8 is in operation and for closing the means 8 while the means 2 is in operation. The valves 24 and 81 can also be electromagnetic valves for an automatic operation.

When the measuring and vaporing vacuum suction means are connected to the second chamber 4 as in the apparatus of FIGS. 3 and 5 according to the invention, the suction circuit, vacuum pump, etc. of one of these means are of course usable as the circuit, vacuum pump, etc. of the other means. The same is true of the case in which the vaporing and measuring vacuum suction means are connected to the first chamber 1 as in each of the apparatus shown in FIGS. 4 and 5.

In the case where the sealed container A having a large pinhole is checked in the first chamber 1 for rejection as described above, the cold trap or like heat exchanger adapted to act on the interior of the first chamber may be disposed within the first chamber as in the apparatus shown in FIG. 1, but it is more preferable to arrange such exchangers outside the first chamber as in the embodiments shown in FIGS. 4 and 5.

Containers may be checked for pinholes in the first chamber, for example, merely for recording the checking result in the first chamber so that a container, even if having a large pinhole, may be rechecked in the second chamber to determine whether the container is to be rejected as an unacceptable article or to be delivered as an acceptable article. In this case, the container with a large pinhole detected in the first chamber will not be immediately discharged from the system upon the detection.

Figure 6:
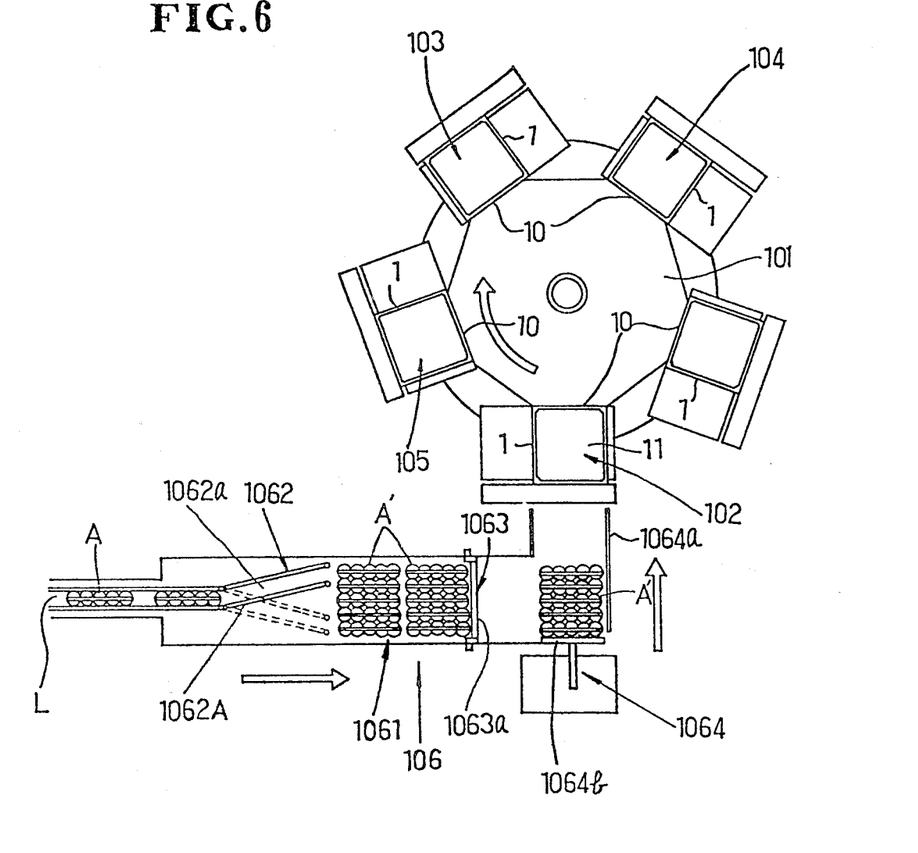
FIG. 6 is a fragmentary plan view schematically showing still another embodiment of the apparatus of the invention.

Next, an apparatus for detecting pinholes more efficiently than the foregoing apparatus will be described with reference to FIG. 6 which is a fragmentary plan view schematically showing the apparatus.

A plurality of units 10, each comprising the same first chamber, second chamber and first to third closure means as in the apparatus of FIGS. 1 to 5, are mounted on a support base 101 as spaced apart along the periphery of the base which is intermittently rotatable by an unillustrated known drive device. Provided in the path of movement of the units 10 are a station 102 for feeding containers A, a station 103 for discharging unacceptable containers and a station 104 for delivering acceptable containers. Like the apparatus of FIGS. 1 to 5, the first chamber 1 of each of the units 10 is provided with vaporizing vacuum suction means 2, with a cold trap 3 installed in the first chamber or a pair of cold traps 31 and 32 in means 2 (not shown in FIG. 6). The same measuring vacuum suction means 5 and pressure measuring means 6 (not shown in FIG. 6) as in the apparatus of FIGS. 1 to 5 are connected to the second chamber 4 (positioned under the first chamber and not shown in FIG. 6) of each unit 10. When required, the same vaporizing vacuum suction means 7 and cold traps 71 and 72 as included in the apparatus of FIGS. 3 and 5 are connected to the second chamber 4.

Further when required, the same measuring vacuum suction means 8 and pressure measuring means 9 as used in the apparatus of FIGS. 4 and 5 are connected to the first chamber 1.

The vacuum suction means 2, 5, 7, 8, the cold traps 31, 32, 71, 72 and the pressure measuring means 6, 9 are arranged, for example, on the rotatable support base 101.

Although each of the suction means, each pair of the cold traps and each of the pressure measuring means may be provided in each unit 10, one or at least two of such components may of course be so connected as to be commonly used for two or more units 10.

When the measuring vacuum suction means 8 and pressure measuring means 9 are connected to the first chamber 1, a station 105 for discharging containers A with a large pinhole is disposed between the feeding station 102 and discharging station 103.

The feeding station 102 is provided with a feeder 106 connected to a production line L for the containers A when so desired. The feeder 106 comprises means 1062 by which the containers A sent forward from the line L in alignment are arranged on the feeding end, serving as a lot station, of a conveyor 1061 and thereby grouped into lots A' each comprising a pluarity of containers A, stopper means 1063 for retaining a specified number of containers A at an intermediate portion of the conveyor 1061 to form the lot, and pushing means 1064 by which the lot A' released from the stopper means 1063 is pushed to the first chamber inlet of the unit 10 located at the station 102. The arranging means 1062 comprises a turnable arm means 1062A having a container passage 1062a, one end pivoted to the delivery end of the line L and the other end extending to the conveyor 1061, and unillustrated suitable drive means for turning the arm to arrange the containers. The stopper means 1063 comprises a stopper 1063a movable upward from or downward into the path of travel of the lot A' by unillustrated drive means, and suitable unillustrated means, such as photoelectric switch, limit switch or the like, for raising the stopper upon detecting the arrival of the specified number of containers at the position of the stopper. The pushing means 1064 comprises a stopper wall 1064a provided at the other end of the conveyor 1061, a pusher 1064b for pushing out the lot A' along the stopper wall and an air cylinder or like suitable unillustrated means for driving the pusher.

The stations 103, 104 and 105 are provided with suitable unillustrated conveyors for receiving and transferring the lots A' falling off the units 10.

Accordingly lots A' are fed one after another to the units 10 brought to the station 102. When the first chamber of the unit 10 is not connected with the measuring vacuum suction means 8 and the pressure measuring means 9, the lot A' is checked by the foregoing procedure before the unit 10 moving to the station 103 from the station 102 leaves the station 103. The container lot A', when found unacceptable with a pinhole, is discharged at the station 103. When not having any pinhole, the lot A' is delivered at the station 104. The vaporizing suction means 7 and cold traps 71 and 72, when connected to the second chamber of the unit 10, finish their operation after the unit 10 has passed the station 104 before another lot A' is placed into the second chamber.

When the unit 10 has the means 8 and 9 connected to its first chamber, the lot is checked for large pinholes by the aforementioned procedure before the unit 10 moving to the station 105 from the station 102 leaves the station 105. A lot A' is discharged at the station 105 when having a large pinhole. When free from any large pinhole, the lot A' is further checked by the foregoing procedure before the unit 10 moving to the station 103 from the station 105 leaves the station 103. The lot A' is discharged at the station 103 when having a pinhole or is delivered at the station 104 when free from any pinhole.

With any of the apparatus shown in FIGS. 1 to 6, it is of course desirable to fully dry the first chamber 1 by the vaporizing suction means 2 and the cold trap 3 or traps 31 and 32 before a container or containers A are placed into the first chamber 1.

While the container A is placed into the first chamber 1, transferred from the first chamber 1 to the second chamber 4 and delivered from the second chamber 4 by being allowed to fall under gravity in the foregoing apparatus, the container A may be moved by air cylinder or like suitable means, for example, when the first and second chambers are arranged horizontally as connected together.

Figures 7, 8:
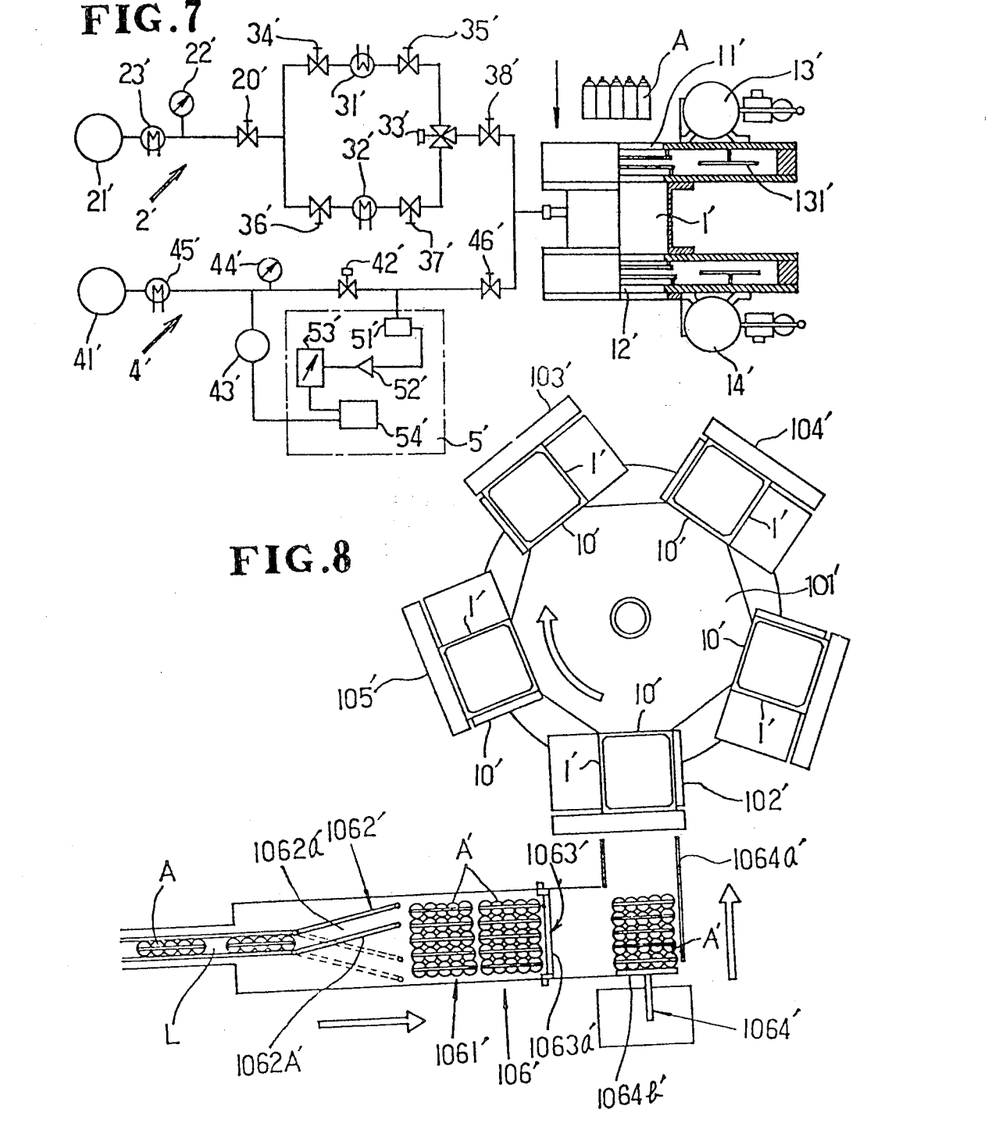
FIG. 7 is a schematic side elevation partly broken away and showing still another embodiment of the apparatus of the invention.
FIG. 8 is a fragmentary plan view schematically showing still another embodiment of the apparatus of the invention.

A method and apparatus will now be described below by which the vaporizable substances deposited in a checking chamber or adhering to the surface of a sealed container can all be collected quickly within the chamber before the container is checked for pinholes so that pinholes can be detected substantially free of disturbances. FIG. 7 shows an example of such apparatus, and FIG. 8 a more efficient example.

The apparatus of FIG. 7 will be described first. A checking chamber 1' has a top wall and a bottom wall formed with an inlet 11' and an outlet 12'. The inlet 11' is provided with first closure means 13' for hermetically closing the inlet, and the outlet 12' with second closure means 14' for hermetically closing the outlet. The first closure means 13' is of the type comprising a closure 131' slidably provided for the inlet 11' to open or hermetically close the inlet 11' and an air cylinder or like pneumatic means which is operable by an electromagnetic valve for opening or closing the closure 131' (such as a gate-type pneumatic valve Model VAP, product of Nippon Shinku Gijutsu Kabushiki Kaisha). Various other automatic or manual known devices are of course usable as the closure means. The second closure means 14' has the same construction as the means 13'.

Vaporizing vacuum suction means 2' connected to the checking chamber 1' comprises a vacuum pump 21' connected to the checking chamber 1' by a pipe. When required, a valve (such as a manual valve 20') for maintenance, inspection, etc. and a vacuum gauge 22' for checking the operation of the vacuum suction means 2' can be suitably connected to the pipe between the checking chamber 1' and the pump 21'. A cold trap or other cooling heat exchanger 23' for protecting the pump 21' can also be connected to the pipe in the vicinity of the pump 21'.

The vacuum suction means 2' has a plurality of cold traps 31' and 32' (two traps in the embodiment of FIG. 7) which are connected side by side in the circuit of the means 2' for freezing and collecting vaporized substances. The traps 31' and 32' are arranged preferably close to the checking chamber 1' to the greatest possible extend so as to efficiently freeze and collect the vaporized substances within the checking chamber. Although the traps 31' and 32' are replaceable by a single trap, at least two traps may be provided in parallel as illustrated so that one or two or more of the traps can be used selectively or simultaneously as desired by operating a valve (three-way electromagnetic valve in the illustrated case) 33' located at a junction in accordance with the capacity of the trap, interior humidity of the checking chamber, etc.

The traps 31' and 32' are installed removably so as to be replaceable as desired in the event an excessive amount of vaporizable substances is frozen to the traps. The traps 31' and 32' may be fixedly provided in the means 2', in which case an unillustrated liquid receptacle is disposed under the traps 31' and 32' to withdraw the excessive amount of frozen substances as liquefied. The traps can be provided with a suitable heater to rapidly liquefy the frozen substances.

FIG. 7 further shows manual valves 34', 35', 36' and 37' which are closed when, for example, the traps are to be replaced. Suitable electromagnetic valves are of course usable as these and other valves for an automatic operation.

The cold traps 31' and 32' are adapted to freeze vaporized substances but may be of the liquefying type. However, the freezing type is preferable.

In place of the cold traps, other cooling heat exchangers are of course usable which have the same function (i.e. the function of freezing or liquefying vaporized substances). For example, the checking chamber 1' can be provided with a double wall construction serviceable as a heat exchanger of the jacket type. The checking chamber 1' is further connected with measuring vacuum suction means 4' and pressure measuring means 5'.

The measuring vacuum suction means 4' comprises a vacuum pump 41' connected to the checking chamber 1' by a pipe, an electromagnetic valve 42' connected between the checking chamber 1' and the pump 41' and a pressure switch 43' for operating the valve 42'. When the checking chamber 1' is evacuated by the pump 41' to a predetermined vacuum, the pressure switch 43' functions to close the valve 42' to stop or interrupt the application of suction to the checking chamber 1'. As the means for stopping or interrupting the application of suction to the checking chamber 1' when the checking chamber 1' is evacuated to the predetermined vacuum, it is possible to use other suitable means, such as a suitable pressure gauge, in place of the pressure switch 43' and a manual valve, in place of the electromagnetic valve 42', which is closed while the operator is watching the pressure gauge.

When desired, a valve for maintenance, inspection, etc. and a vacuum gauge 44' for checking the operation of the vacuum suction means 4' can be suitably connected to the pipe between the checking chamber 1' and the pump 41'. A cold trap or other cooling heat exchanger 45' for protecting the pump 41' can also be connected to the pipe in the vicinity of the pump 41'.

The pressure measuring means 5' comprises a pressure sensor 51' positioned between the checking chamber 1' and the vacuum suction stop valve 42' and connected to the pipe from the checking chamber for detecting the rise of pressure within the chamber 1' and converting the pressure value to a current, an amplifier 52' for amplifying the input from the pressure sensor, a meter relay 53' for indicating the input from the amplifier 52' and also for emitting a signal indicating whether or not the input from the amplifier 52' is lower than the predetermined standard value stored therein for detecting pinholes, and an indicator 54' for indicating the presence or absence of a pinhole in accordance with the input from the meter relay 53'.

Accordingly pinholes can be detected by the operator memorizing the standard value and monitoring the meter relay 53', or merely by watching the indicator 54'.

The indicator 54' may be provided with means for receiving a signal from the pressure switch 43' to indicate whether or not the measuring means is in checking operation (in other words, whether the electromagnetic valve 42' is open or closed). Furthermore for an automatic checking operation, the indicator 54' can be provided therein with a controller for automatically controlling electromagnetic valves suitably provided for the vacuum suction means and electromagnetic valves for the closure means 13' and 14', etc. in accordance with a signal from the meter relay 53' or the amplifier 52' and/or a signal from the pressure switch 43'.

A simple pressure gauge or other suitable means is usable in place of the foregoing arrangement to serve as the above pressure measuring means.

Valves 38' and 46' are provided for closing the means 4' while the means 2' is in operation and for closing the means 2' while the means 4' is in an operation. Electromagnetic valves are usable as the valves 38' and 46' for an automatic operation.

For an illustrative purposes, the method of this invention to be practiced with the apparatus of FIG. 7 will be described below.

With the outlet 12' of the checking chamber 1' closed by the closure means 14', the outlet 11' is opened by the closure means 13'. The sealed container A to be checked is placed into the chamber 1' through the inlet, and the inlet 11' is closed to render the chamber 1' hermetic. The valve 38' of the vacuum suction means 2' is opened, and the valve 46' of the vacuum suction means 4' closed. Subsequently the checking chamber 1' is evacuated by a vacuum by the vaporizing vacuum suction means 2' to vaporize vaporizable substances off the surface of the container A (and also off the inner surface of the checking chamber 1', if any). The vaporized substances are cooled and collected by the cold traps 31' and 32' disposed in the means 2' to substantially remove the vaporizable deposits from the surface of the container A (and also from the inner surface of the chamber, if any). The valve 38' is thereafter closed, and the valve 46' opened. Subsequently the checking chamber 1' is evacuated to a predetermined vacuum by the measuring vacuum suction means 4', and the evacuation of the checking chamber 1' is thereafter stopped or interrupted. The rise of the internal pressure of the checking chamber 1' is then measured by the pressure measuring means 5'. The increased pressure value indicates that the container has a pinhole when it is not lower than a standard value preset for detecting pinholes. If lower than the standard value, the pressure value indicates that the container has no pinhole.

The outlet 12' of the checking chamber 1' is thereafter opened, allowing the checked container A to fall off the chamber.

After the completion of checking, the checking chamber 1' is closed at the outlet 12' and made hermetic. With the valve 46' closed and the valve 38' opened, the vaporizing vacuum suction means 2' and the cold traps 31' and 32' are operated, whereby the vaporizable substance vaporizing through the pinhole of the container A during checking and remaining in the chamber is cooled and collected. It is preferable to prepare the chamber for the next checking cycle in this way.

One of the vaporizing and measuring vacuum suction means may of course utilize the vacuum suction circuit, vacuum pump, etc. of the other means as its own circuit, vacuum pump, etc.

However, when the vaporizing vacuum suction means, for example, is utilized as the measuring suction means, it is of course desirable that the pressure measuring means be connected to the checking chamber at a location closer to the chamber than the cold traps arranged in the vaporizing vacuum suction means.

An apparatus will be described below for detecting pinholes more efficiently than the above apparatus.

FIG. 8 is a fragmentary plan view schematically showing the apparatus.

A plurality of units 10', each comprising the same checking chamber 1' and first and second closure means 13', 14' as in the apparatus of FIG. 7, are mounted on a support base 101' as spaced apart along the periphery of the base which is intermittently rotatable by an unillustrated known drive device. Provided in the path of movement of the units 10' are a station 102' for feeding containers A, a station 103' for discharging unacceptable containers and a station 104' for delivering acceptable containers. Like the apparatus of FIG. 7, the checking chamber 1' of each of the units 10' is provided with vaporizing vacuum section means 2', with a pair of cold traps 31' and 32' included in the means 2' (not shown in FIG. 8). Further the same measuring vacuum suction means 4' and measuring means 5' as used in the apparatus of FIG. 7 are connected to the checking chamber 1' of the unit 10' (not shown in FIG. 8).

The vacuum suction means 2', 4', the cold traps 31', 32' and the pressure measuring means 5' are arranged, for example, on the rotatable support base 101'.

Although the suction means, the pair of cold traps and the pressure measuring means may be provided in each unit 10', one or at least two of such components may of course be so connected as to be used commonly for two or more units 10'.

When it is desired that containers A with an apparently large pinhole be discharged at a location before the station 103', a station 105' is provided between the feeding station 102' and the discharging station 103' for discharging the containers A having a large pinhole.

The feeding station 102' is provided with a feeder 106' connected to a production line L for the containers A when so desired. The feeder 106' comprises means 1062' by which the containers A sent forward from the line L in alignment are arranged on the feeding end, serving as a lot station, of a conveyor 1061' and thereby grouped into lots A' each comprising a plurality of containers A, stopper means 1063' for retaining a specified number of containers A at an intermediate portion of the conveyor 1061' to form the lot, and pushing means 1064' by which the lot A' released from the stopper means 1063' is pushed to the first chamber inlet of the unit 10' located at the station 102'. The arranging means 1062' comprises a turnable arm means 1062A' having a container passage 1062a', one end pivoted to the delivery end of the line L and the other end extending to the conveyor 1061', and unillustrated suitable drive means for turning the arm to arrange the containers. The stopper means 1063' comprises a stopper 1063a' movable upward from or downward into the path of travel of the lot A' by unillustrated drive means, and suitable unillustrated means, such as photoelectric switch, limit switch or the like, for raising the stopper upon detecting the arrival of the specified number of containers at the position of the stopper. The pushing means 1064' comprises a stopper wall 1064a' provided at the other end of the conveyor 1061', a pusher 1064b' for pushing out the lot A' along the stopper wall and an air cylinder or like suitable unillustrated means for driving the pusher.

The stations 103', 104' and 105' are provided with suitable unillustrated conveyors for receiving and transferring the lots A' falling off the units 10'.

Accordingly lots A' are fed one after another to the units 10' brought to the station 102'.

When the station 105' is not used, container lots are checked in the manner already described before the unit 10' moving to the station 103' from the station 102' leaves the station 103'. The lots A' of unacceptable containers with a pinhole are discharged at the station 103', while those with no pinhole are delivered at the station 104'. It is desired that the checking chamber 1' be dried by the means 2' and the traps 31' and 32' after the unit 10' has passed the station 104' before a lot A' is subsequently fed to the checking chamber 1'.

When it is desired to discharge containers A with a large pinhole at the station 105', the containers are checked for pinholes in the foregoing manner before the unit 10' moving to the station 105' from the station 102' leaves the station 105'. The lots A' with a large hole are discharged at the station 105'. The lots A' with a small pinhole are discharged at the station 103'. The lots A' with no pinhole are delivered at the station 104'.

I claim:

1. A method of checking sealed containers for pinhole leaks therein, said containers having a vaporizable substance enclosed therein and said method being characterized by placing the sealed container into a first chamber, hermetically closing the first chamber, evacuating the first chamber to a a predetermined vacuum by use of a vaporizing vacuum suction means connected to the first chamber to vaporize a vaporizable substance off the surface of the sealed container, substantially removing the vaporizable substance from the surface of the sealed container by cooling and collecting the vaporized substance with a cooling heat exchanger in the heat exchanger relationship with respect to the interior of the first chamber, thereafter placing the sealed container into a second chamber connected to the first chamber hermetically closing the second chamber, evacuating the second chamber to a predetermined vacuum by measuring vacuum suction means connected to the second chamber, thereafter interrupting the evacuation of the second chamber, measuring increase of the pressure within the second chamber, and comparing the increased pressure with a predetermined standard pressure value, whereby an indication is provided that the container has a pinhole leak when the increased pressure value is not lower than said predetermined standard pressure value and an indication is provided that the container has no pinhole leak when the increased pressure value is lower than the standard pressure value.

2. A method of checking sealed containers for pinhole leaks as defined in claim 1 and characterized in that the substance, when flowing out or vaporizing from the sealed container into the second chamber during the comparing step, is cooled and collected by a cooling heat exchanger in heat exchange relationship with the interior of the second chamber in preparation for subsequent checking, while re-evacuating the second chamber to a vacuum after the comparing step.

3. A method of checking sealed containers for pinhole leaks as defined in claim 1 or 2 and characterized by the substantially removing a vaporizable substance from the interior of the first chamber and from the surface of the sealed container within the first chamber, thereafter evacuating the first chamber to a predetermined vacuum by vacuum suction means connected to the first chamber, interrupting the evacuation of the first chamber, thereafter measuring increase of the pressure within the first chamber, and discharging the sealed container from the first chamber when the increased pressure value is not lower than a predetermined auxiliary standard pressure value or placing the sealed container into the second chamber connected to the first chamber when the increased pressure value is lower than the auxiliary standard pressure value.

4. An apparatus for checking sealed containers for pinhole leaks, said containers having a vaporizable substance enclosed therein and said method being characterized in that the apparatus comprises a first chamber having an inlet and an outlet for the sealed containers, a second chamber having an inlet and an outlet for the sealed containers and being connected to the first chamber with the inlet of the second chamber in communication with the outlet of the first chamber, first closure means for hermetically closing the inlet of the first chamber, second closure means for hermetically closing the outlet of the first chamber and the inlet of the second chamber, third closure means for hermetically closing the outlet of the second chamber, vaporizing vacuum suction means connected to the first chamber to vaporize any vaporizable substance therein, a cooling heat exchanger in heat exchange relationship with the interior of the first chamber, and vacuum suction measuring means and pressure measuring means connected to the second chamber.

5. An apparatus for checking sealed containers for pinhole leaks as defined in claim 4 and characterized in that the apparatus further comprises vaporizing vacuum means connected to the second chamber and a cooling heat exchanger in heat exchange relationship with the interior of the second chamber.

6. An apparatus for checking sealed containers for pinhole leaks as defined in claim 4 or 5 and characterized in that the apparatus comprises vacuum suction measuring means and pressure measuring means which are connected to the first chamber.

7. An apparatus for checking sealed containers for pinhole leaks, said containers having a vaporizable substance enclosed therein and said method being characterized in that the apparatus comprises a plurality of units arranged on a rotatable support base and spaced apart along the periphery of the base, each of the units including a first chamber having an inlet and an outlet for the sealed containers, a second chamber having an inlet and an outlet for the sealed containers and connected to the first chamber with the inlet of the second chamber in communication with the outlet of the first chamber, first closure means for hermetically closing the inlet of the first chamber, second closure means for hermetically closing the outlet of the first chamber and the inlet of the second chamber and third closure means for hermetically closing the outlet of the second chamber, the units being movable along a path comprising a station for feeding the sealed container to be checked to the units, a station for discharging unacceptable sealed containers having pinhole leaks therein from the units and a station for delivering acceptable sealed containers not having pinhole leaks from the units, the first chamber of each of the units being connected to vaporizing vacuum suction means to vaporize any of said vaporizable substance therein and a cooling heat exchanger in heat exchange relationship with the interior of the first chamber, the second chamber of each of the units being connected to vacuum suction measuring means and pressure measuring means.

8. An apparatus for checking sealed containers for pinhole leaks as defined in claim 7 and characterized in that the second chamber of each of the units is connected to vaporizing vacuum suction means and a cooling heat exchanger in heat exchange relationship with the interior of the second chamber.

9. An apparatus for checking sealed containers for pinhole leaks as defined in claim 7 or 8 and characterized in that the first chamber of each of the units is connected to vacuum suction measuring means and pressure measuring means.

* * * * *